United States Patent
Dignitti et al.

(10) Patent No.: US 6,347,679 B1
(45) Date of Patent: Feb. 19, 2002

(54) BATTERY RETAINING SYSTEM FOR CHILDREN'S RIDE-ON VEHICLES

(75) Inventors: Daniel M. Dignitti, Hamburg; Gerald P. Sitarski, Grand Island, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/711,253

(22) Filed: Nov. 9, 2000

(51) Int. Cl.[7] .............................................. B60R 16/04
(52) U.S. Cl. ...................... 180/68.5; 180/65.1; 248/500
(58) Field of Search ............................... 180/68.5, 65.1, 180/65.6; 429/96, 97, 98, 99, 100; 248/500, 503, 505, 510; 292/162, 175; 105/51

(56) References Cited

U.S. PATENT DOCUMENTS

| | | | |
|---|---|---|---|
| 1,392,757 A | | 10/1921 | Gales |
| 1,636,562 A | | 7/1927 | Hick |
| 1,934,588 A | * | 11/1933 | Butler ........................ 180/68.5 |
| 2,136,749 A | | 11/1938 | Martino |
| 2,588,870 A | * | 3/1952 | Pittman ...................... 180/68.5 |
| 3,333,810 A | | 8/1967 | Schlapman |
| 4,146,682 A | * | 3/1979 | Nakao .......................... 429/97 |
| 4,221,450 A | | 9/1980 | Sears |
| 4,339,105 A | | 7/1982 | Witt |
| 4,355,695 A | | 10/1982 | Leskovec |
| 4,511,637 A | * | 4/1985 | Evans ......................... 429/100 |
| 4,632,201 A | | 12/1986 | Kay |
| 4,696,508 A | | 9/1987 | Brautigam |
| 4,716,632 A | | 1/1988 | Perl |
| 4,991,674 A | | 2/1991 | Fullenkamp |
| 5,004,081 A | | 4/1991 | Custer |
| 5,222,711 A | | 6/1993 | Bell |
| 5,307,890 A | | 5/1994 | Huang |
| 5,434,494 A | * | 7/1995 | Perego ........................... 320/2 |
| 5,477,936 A | | 12/1995 | Sugioka et al. |
| 5,845,724 A | * | 12/1998 | Barrett ....................... 180/65.1 |
| 6,161,810 A | * | 12/2000 | Crow et al. .................. 248/503 |
| 6,179,331 B1 | * | 1/2001 | Jones, Jr. et al. ........... 280/827 |
| 6,186,256 B1 | * | 2/2001 | Dignitti ...................... 180/68.5 |

FOREIGN PATENT DOCUMENTS

JP        226427        *    9/1989

* cited by examiner

Primary Examiner—Brian L. Johnson
Assistant Examiner—Bryan Fischmann
(74) Attorney, Agent, or Firm—Kolisch, Hartwell, Dickinson, McCormack & Heuser, PC

(57) ABSTRACT

A battery retaining system for a children's ride-on vehicle. The system includes a retaining member that is selectively movable between a first or nominal position in which the retaining member blocks removal of a battery assembly from the body of the vehicle, and a second position in which the retaining member does not block removal of the battery assembly. The battery retaining system also includes a biasing member coupled to the retaining member and configured to urge the retaining member from the second position toward the first position.

23 Claims, 7 Drawing Sheets

BATTERY RETAINING SYSTEM FOR CHILDREN'S RIDE-ON VEHICLES

FIELD OF THE INVENTION

The present invention is directed to children's ride-on vehicles, and more particularly, to a battery retaining system for children's ride-on vehicles.

BACKGROUND

Battery-powered children's ride-on vehicles are a popular toy for children. The batteries for these vehicles are usually carried within a compartment on the vehicle. Typically, the compartment is easily accessible so that the battery may be removed, such as for replacement or recharging.

To prevent injury or accident, the battery should be securely held within the compartment. If a battery overturns or becomes displaced within the compartment, the battery and/or the vehicle may be damaged. For example, the vehicle typically includes electrical wiring that connects the battery to one or more battery-powered components on the vehicle. An overturned battery may damage or displace the wiring, causing an electrical short or similar hazard. Further, a battery which is not secured within the battery compartment may fall out of the compartment and possibly injure the rider.

One method of securing the battery is to construct a battery compartment that is approximately the same shape and size as the battery. However, the battery may still be unintentionally removed from the compartment, such as if the vehicle tips over. Furthermore, future battery designs would be limited by the dimensions of the compartment.

Another securing method is to install a battery retaining device on the vehicle to hold the battery in place by clamping across the battery. However, prior retaining devices have been difficult to use, have required tools to attach or remove, and/or have been prone to becoming dislodged from the battery thereby allowing the battery to move. Also, because it is removable, the device may be lost, or simply not reinstalled because of the time and effort required to reinstall the device.

SUMMARY

The present invention provides a battery retaining system for a children's ride-on vehicle. The battery retaining system includes a retaining member that is selectively movable between a first, or nominal, position in which the retaining member blocks removal of a battery assembly from the body of the vehicle, and a second position in which the retaining member does not block removal of the battery assembly. The battery retaining system also includes a biasing member coupled to the retaining member and configured to urge the retaining member from the second position toward the first position.

DETAILED DESCRIPTION AND BEST MODE OF THE INVENTION

Figure 1:
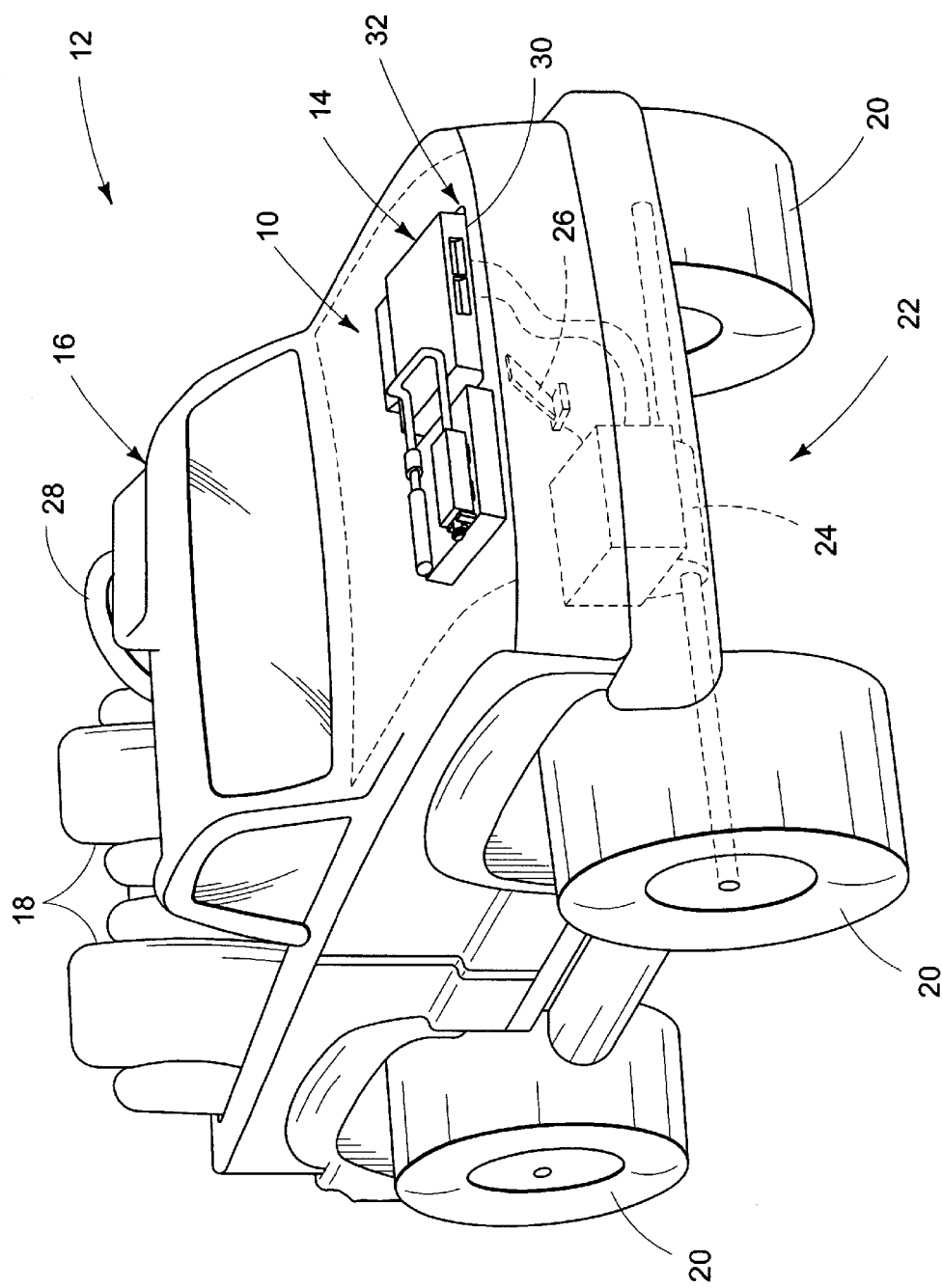
FIG. 1 is a schematic, front isometric view of a children's ride-on vehicle having a battery retaining system in accordance with the present invention.

A battery retaining system according to the present invention is indicated generally at 10 in FIG. 1. System 10 is configured for use on a vehicle 12 having a battery assembly 14. The battery assembly is adapted to power one or more battery-powered components of vehicle 12. At least a portion of battery-retaining system 10 is selectively positionable to prevent battery assembly 14 from becoming dislodged during operation of the vehicle.

In the exemplary embodiments described below, vehicle 12 is depicted as a children's ride-on vehicle in the form of a truck. However, it will be appreciated that battery-retaining system 10 may be configured for use on any type of children's ride-on vehicles having one or more battery-powered components. Therefore, the invention is not limited to the particular exemplary embodiments depicted and described herein, but includes all such children's ride-on vehicles. For example, vehicle 12 may take any one of a variety of different forms adapted to simulate real vehicles in reduced scale, including a car, truck, bus, motorcycle, carriage, tractor, construction equipment, etc.

Children's ride-on vehicle 12 includes a support frame or body 16 sized and configured to carry a child, or pair of children. Body 16 is typically formed of a plurality of molded, rigid plastic parts secured together by screws, nuts, bolts, and similar fasteners. It should be understood that body 16 may be formed of any other suitable materials. Depending on the particular form, body 16 may include one or more seats 18 sized to receive a child.

Vehicle 12 also includes wheels 20 rotatably coupled to body 16, and a drive assembly 22 coupled to drive at least one of the wheels. Any suitable mechanism for drive assembly 22 may be used, as is known in the art. While the drive assembly is illustrated in FIG. 1 as being coupled to the front wheels, it will be appreciated that the drive assembly may be coupled to drive one or both of the rear wheels instead of, or in addition to, the front wheels. Drive assembly 22 may be directly coupled to the wheels, or may be indirectly coupled through one or more linkages, gears, axles, etc. In the exemplary embodiment, drive assembly 22 includes a battery-powered motor assembly 24 having one or more motors adapted to drive the wheels. Motor assembly 24 may also be configured to power other movable components on vehicle 12 depending on the form of the vehicle. For example, the motor assembly may be coupled to raise and lower the blade of a bulldozer or the bed of a dump truck, etc.

In any event, motor assembly 24 is operably connected to battery assembly 14 by suitable connectors such as cables, wires, etc. Vehicle 12 may include one or more control elements such as pedal 26 which are connected to battery assembly 14 and/or motor assembly 24. Pedal 26 is operable by the rider to control the motor assembly and, therefore, the operation of the wheels. Typically, vehicle 12 includes control elements to enable the rider to control both the speed and direction of the motor assembly. In addition to pedal 26, any other type of control element suitable for use on a children's ride-on vehicle may be used, including buttons, switches, levers, knobs, etc.

Vehicle 12 includes a steering mechanism such as steering wheel 28 coupled to steer at least one of wheels 20. Alternatively, the steering mechanism may take any other form suitable for operation by a child, including handle-bars, etc. In the exemplary embodiment, steering wheel 28 is operable by the rider to control the direction of the front wheels, which are also the wheels driven by drive assembly 22. Alternatively, the steering mechanism may be configured to steer one or more wheels which are not driven by the drive mechanism.

Battery assembly 14 may be any type of battery assembly suitable for use with a children's ride-on vehicle. Typically, battery assembly 14 includes one or more 6-volt and/or 12-volt rechargeable batteries adapted for powering drive assembly 22. Alternatively, other types of batteries may be used which have either the same or different voltages. In any event, the battery assembly is usually mounted in a battery storage region of body 16 such as battery compartment 30. It will be appreciated that the battery compartment may take any of a variety of different shapes, sizes and configurations depending on the form of vehicle 12, as well as the size and shape of battery assembly 14. In the exemplary embodiment, battery compartment 30 is formed as a part of body 16 adjacent the front of the vehicle. Alternatively, the battery compartment may be disposed at any other desired location on body 16.

Typically, battery compartment 30 includes at least one opening 32 through which the battery assembly may be passed into and out of the battery compartment. Exemplary battery compartment 30 has four side walls and a bottom wall which are generally sized, shaped and arranged to receive battery assembly 14 and prevent substantial lateral movement of the battery assembly. Opening 32 forms the upper portion of the battery compartment and allows the battery assembly to be lowered into, and raised out of, the battery compartment. While the opening extends entirely between each side wall of the exemplary battery compartment to form the upper boundary or "wall" of the battery compartment, it will be appreciated that opening 32 may alternatively be smaller in size and may be formed in any one or more walls of the battery compartment.

Battery-retaining system 10 is mounted on vehicle 12 and positioned to selectively maintain battery assembly 14 within battery compartment 30. In the exemplary embodiment depicted in FIG. 1, the battery-retaining system is mounted on body 16 adjacent opening 32. Alternatively, the battery-retaining system may be mounted at any other location suitable for retaining the battery assembly within the battery compartment.

Figure 2:
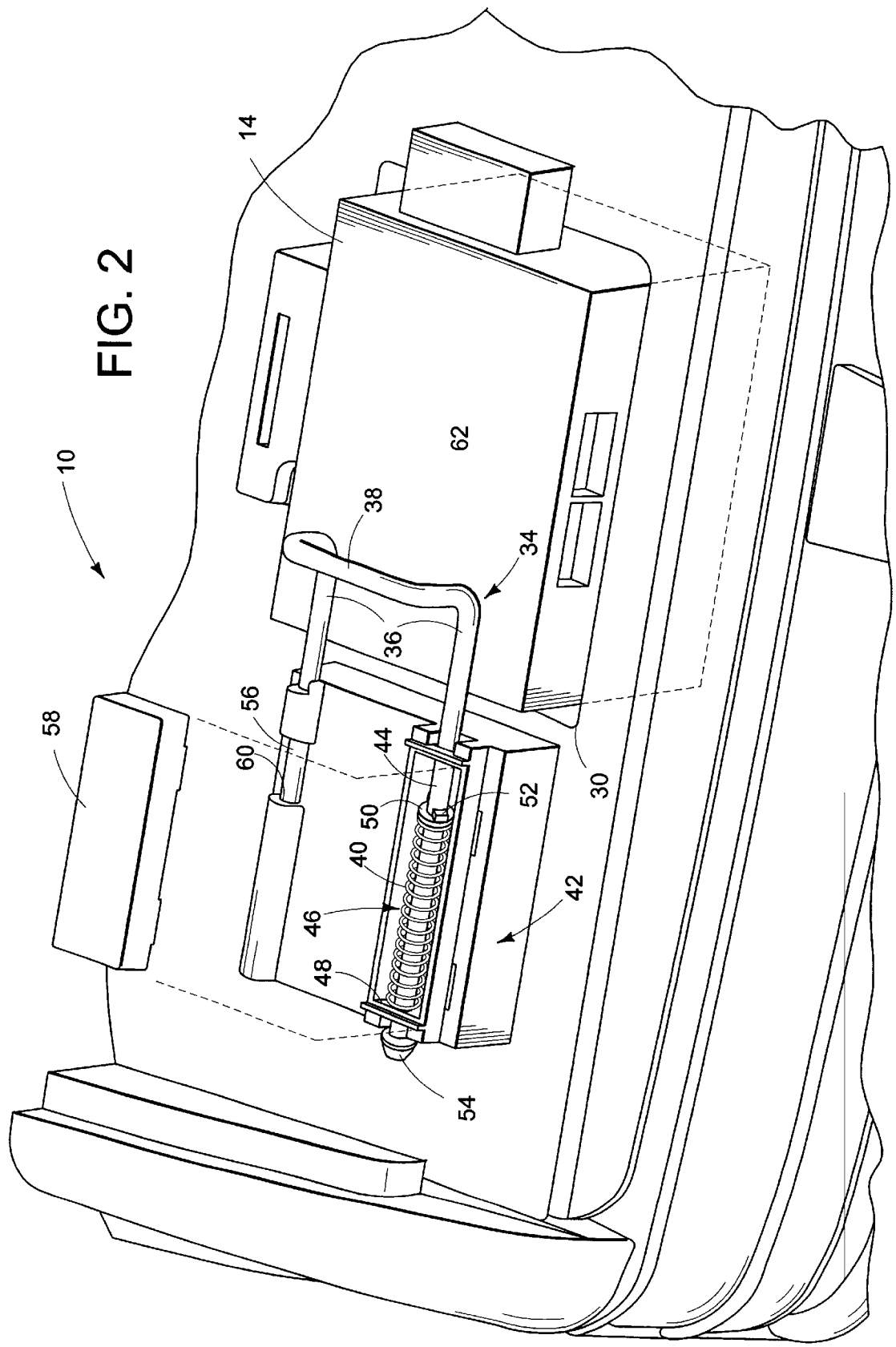
FIG. 2 is a magnified, fragmentary view of the vehicle of FIG. 1 showing details of the battery retaining system.
Figure 3:
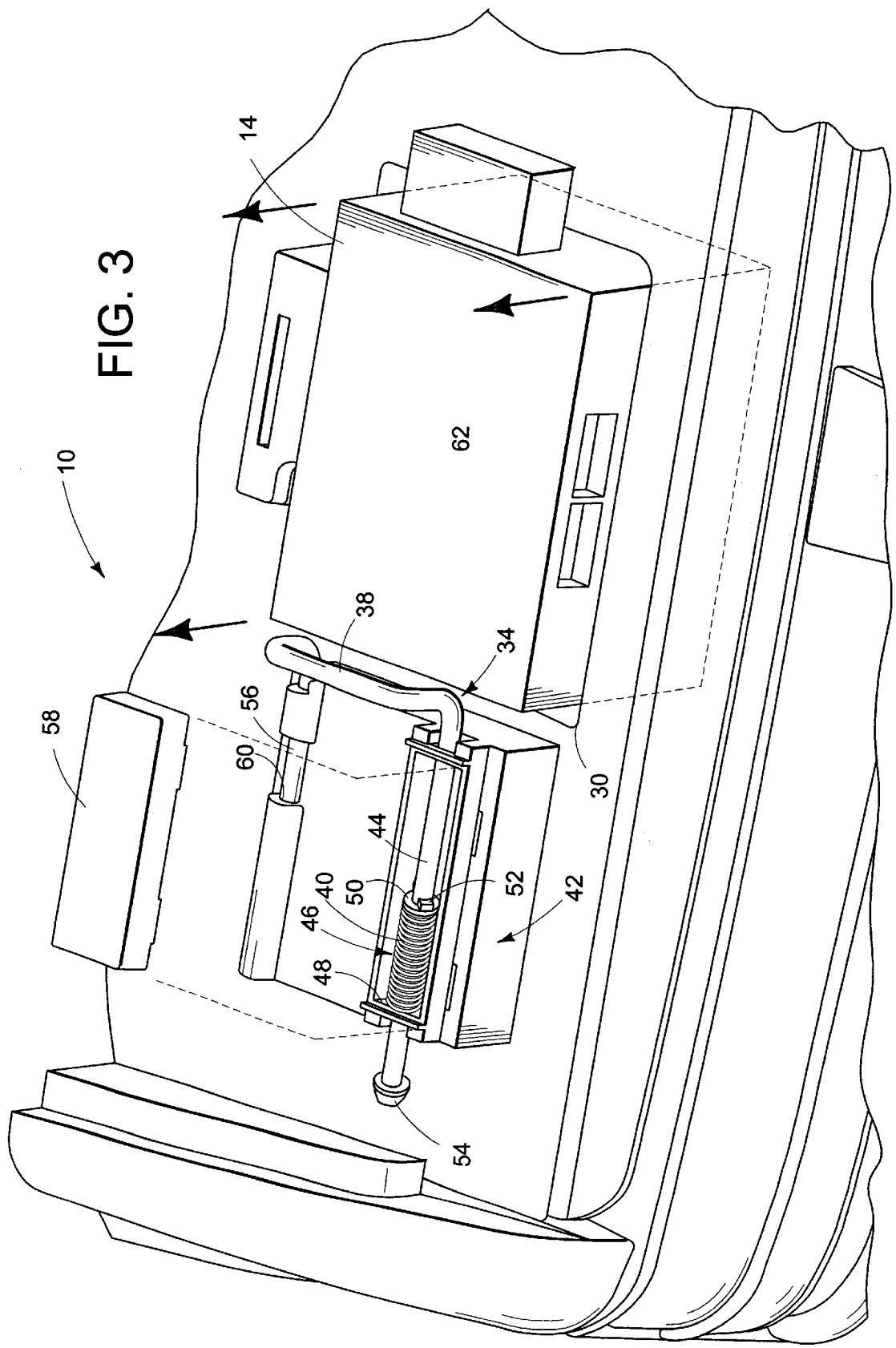
FIG. 3 is similar to FIG. 2 but shows the retaining member of the battery retaining system in its second or retracted position.

Turning attention now to FIGS. 2–3, battery-retaining system 10 includes a retaining member 34 selectively movable between a first, or nominal, position and a second, or retracted, position. When retaining member 34 is in its nominal position, such as shown in FIG. 2, it extends over at least a portion of opening 32 to at least partially obstruct the opening. As a result, retaining member 34 blocks removal of the battery assembly when the retaining member is in the nominal position. In the exemplary embodiment depicted in FIG. 2, retaining member 34 overlies a portion of the top of battery assembly 14, thereby preventing the battery assembly from moving upward, out of the battery compartment. Similarly, if vehicle 12 were to be overturned while retaining member 34 was in the nominal position, the retaining member would prevent the battery assembly from moving laterally or falling out of the battery compartment.

Figure 5:
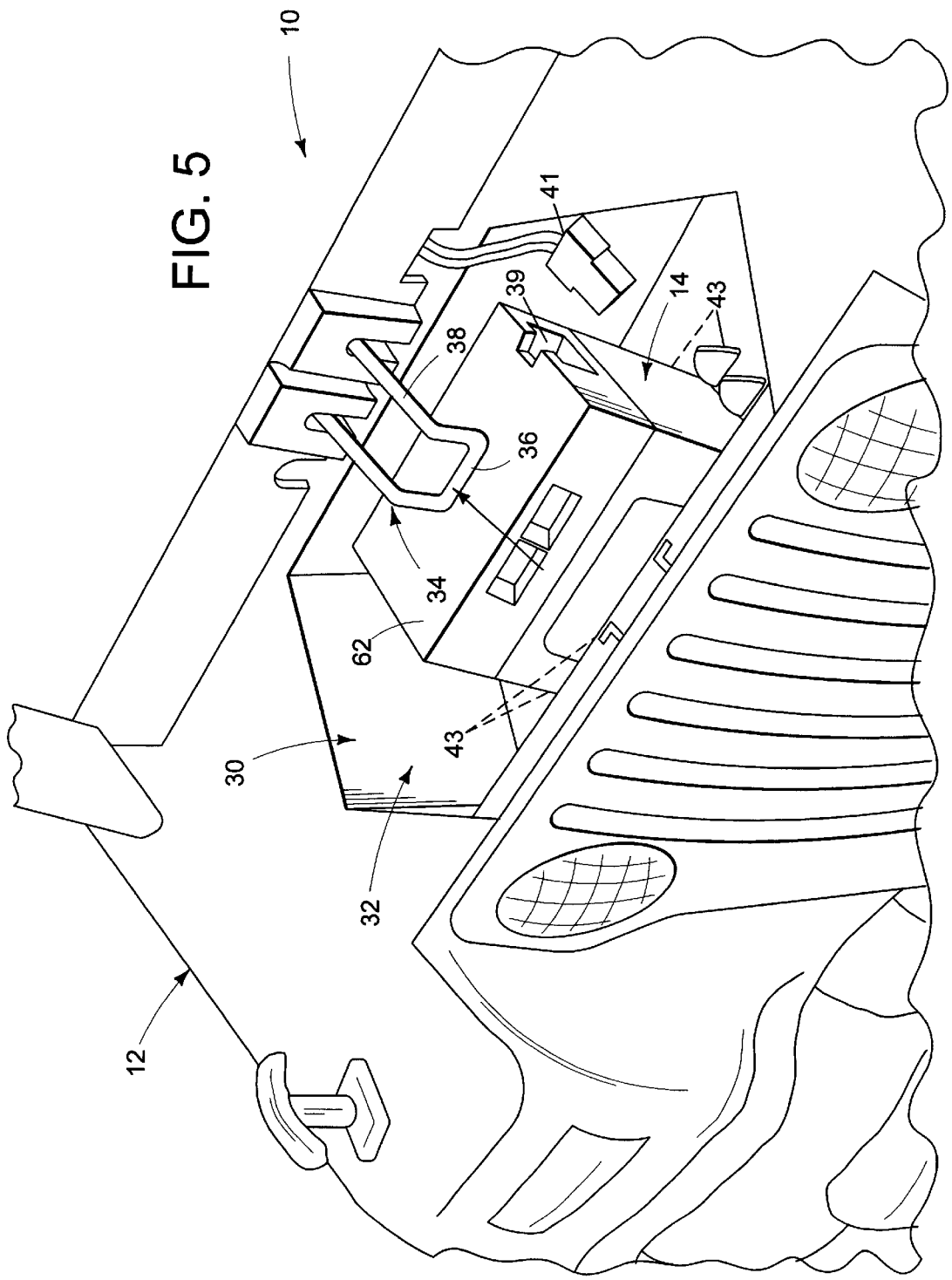
FIG. 5 is a fragmentary, isometric view of a different vehicle having an alternative arrangement of the battery retaining system of FIG. 1.

When retaining member 34 is in its retracted position, such as shown in FIG. 3, it does not block removal of battery assembly 14 from compartment 30. Thus, battery-retaining system 10 allows passage of the battery through opening 32 when the retaining member is in the retracted position. In the exemplary embodiment, retaining member 34 does not extend over a portion of the opening when the retaining member is in the retracted position. However, it will be appreciated that in some alternative arrangements, retaining member 34 may continue to extend over a portion of the battery compartment when in the retracted position without blocking removal of the battery assembly. An example of such an arrangement is shown in FIG. 5, in which the battery compartment is substantially larger than the battery.

Retaining member 34 may take any form suitable for holding battery assembly 14 in place. In the exemplary embodiment depicted in FIG. 2, the retaining member is in the form of a generally U-shaped bar or rod. Additionally, the retaining member may be constructed out of any suitable material adapted to hold the battery assembly in place, including metal (i.e., steel, aluminum, etc.), plastic, composite materials, etc. It will be appreciated that while one specific embodiment of retaining member 34 is depicted in FIGS. 2–3, the retaining member may take a wide variety of other forms as desired or beneficial for a particular application. As one example, an alternative embodiment of retaining member 34 will be described below.

As mentioned above, retaining member 34 is selectively movable between the nominal position and the retracted position by a user. This allows the battery assembly to be quickly and easily installed or removed. Optionally, the retaining member may include a retaining portion 36 and a handle portion 38. Retaining portion 36 is adapted to extend adjacent at least a portion of the battery assembly when the retaining member is in the nominal position. Handle portion 38 is adapted to extend away from the opening so that the handle portion is spaced-apart from the battery assembly. This allows a user to easily grip handle portion 38 and move the retaining member as desired.

Battery-retaining system 10 also includes a biasing member 40 configured to urge retaining member 34 toward the nominal position when the retaining member is in the retracted position. This ensures that the retaining member does not accidentally move to the retracted position when vehicle 12 is in operation. Thus, to install or remove the battery assembly, the user grips handle portion 38 and moves the retaining member to the retracted position against the urging of the biasing member. Preferably, the biasing member is configured to yield in response to a relatively moderate moving force applied by the user. The user then holds the retaining member in the retracted position while installing or removing the battery assembly. Once the user releases the handle portion, the retaining member automatically moves to the nominal position under the urging of the biasing member.

It will be appreciated that biasing member 40 may take any one or more of a variety of different forms adapted to urge retaining member 34 toward the nominal position. In the exemplary embodiment, biasing member 40 is in the form of a compression spring coupled to the retaining member. Alternatively, spring 40 may be a tension spring, torsion spring, plurality of springs, etc. In any event, spring 40 is coupled to the retaining member so as to be resiliently flexed when the retaining member is moved from the nominal position to the retracted position.

Spring 40 may be coupled to retaining member 34 in any of a variety of different ways. In the exemplary embodiment, battery retaining system 10 includes a housing 42 mounted on the body adjacent battery compartment 30 and opening 32. Housing 42 is attached to vehicle body 16 by any suitable fasteners such as screws, bolts, clips, etc. Alternatively, the housing may be integrally formed with the body. In any event, one leg 44 of retaining member 34 is slidably received in housing 42. Spring 40 is disposed within the housing and coupled to leg 44 to urge the retaining member toward the nominal position. Housing 42 is formed to define an elongate spring-chamber 46 configured to receive spring 40. Leg 44 of the retaining member passes through apertures at each end of spring-chamber 46. Spring 40 is generally loosely coiled around the leg between a rear wall 48 of the spring-chamber and a washer 50 mounted on leg 44. Washer 50 abuts against a shoulder 52 formed on leg 44.

In the exemplary embodiment, an end cap 54 is mounted on the end of leg 44. End cap 54 is larger than the aperture in rear wall 48, and prevents leg 44 from sliding forward and out of the spring-chamber. End cap 54 is formed as a press-fit connector such as is known to those of skill in the art. As a result, both retaining member 34 and biasing member 40 are coupled to housing 42 and vehicle body 16 and are not removable from the body without disassembling or breaking the battery retaining system or separating the housing from the body. Thus, in contrast to prior systems which use a detachable retaining member, battery retaining system 10 is easier to use since it is never removed from the vehicle. Furthermore, system 10 is less susceptible to failure due to lost or damaged parts.

As can be seen in FIG. 3, spring 40 is compressed between washer 50 and back wall 48 when the retaining member is moved to the retracted position. Thus, the spring imparts an urging force on the washer, and thereby the retaining member, as a result of the potential energy stored in the spring. Typically, the spring is somewhat compressed even when the retaining member is in the nominal position so that at least some urging force is imparted to the retaining member to hold it in the nominal position. Optionally, a selectively removable cover 58 may be provided to enclose the spring-chamber and spring to prevent debris from entering the spring-chamber and to protect a child from being accidentally pinched by the spring.

In the exemplary embodiment depicted in FIGS. 2 and 3, the other leg 56 of U-shaped retaining member 34 is slidably received in a molded channel 60 defined by housing 42. Although leg 56 is depicted as being shorter than leg 44, it will be appreciated that the length of leg 56 may alternatively be equal to, or greater than, the length of leg 44. It can be seen that spring-chamber 46 and channel 60 form substantially parallel tracks which guide the movement of legs 44 and 56, respectively. As a result, the retaining member is constrained to move or slide in at least substantially a single direction aligned with spring-chamber 46 and channel 60, toward and away from opening 32. Alternatively, the spring-chamber and channel may be configured to guide the movement of the retaining member in other ways.

Figure 4:
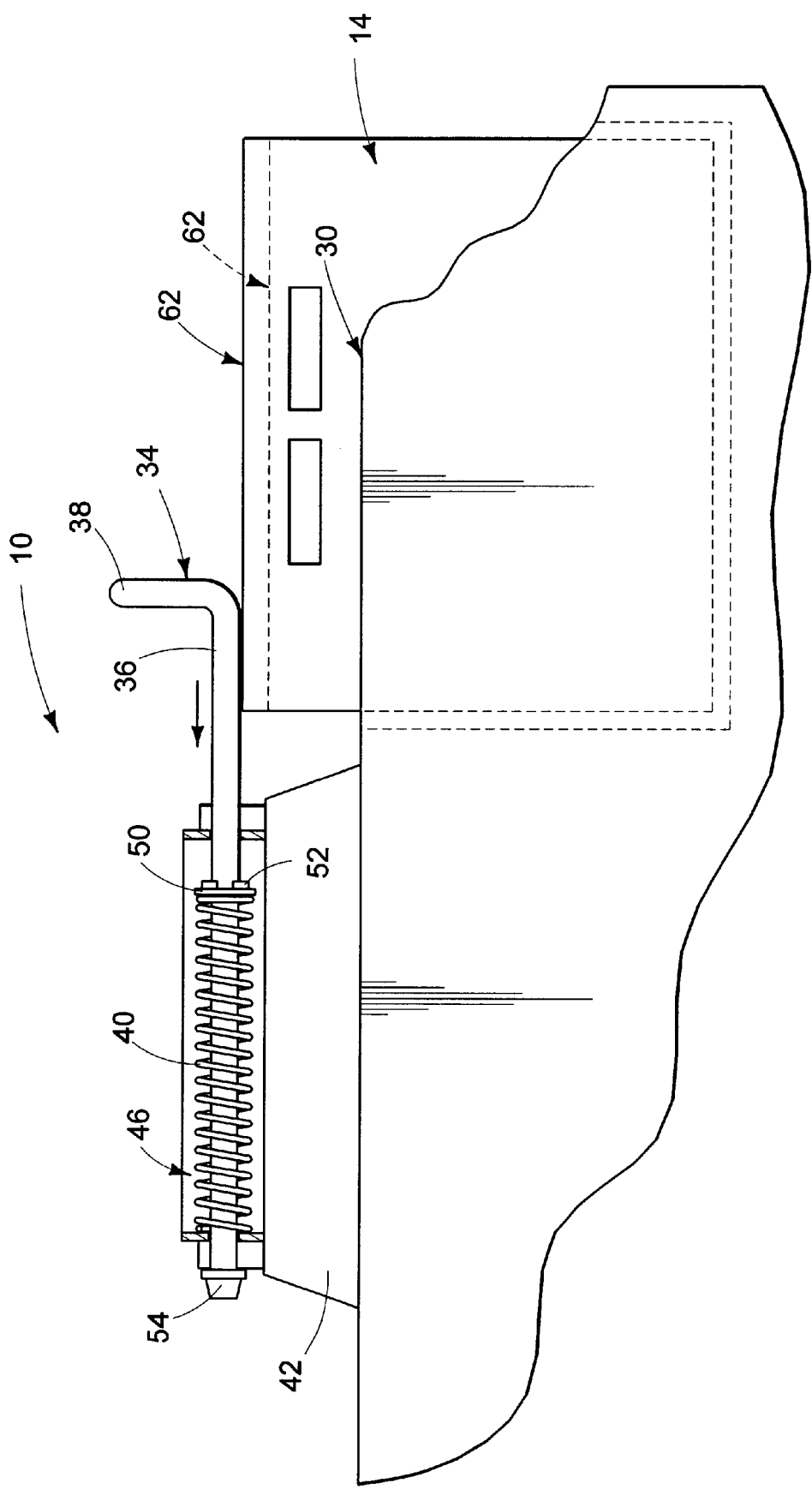
FIG. 4 is a fragmentary side elevation view of the battery retaining system of FIG. 2.

Turning attention now to FIG. 4, it can be seen that retaining member 34 is disposed to slide in a direction generally parallel with the top side 62 of battery assembly 14. It will be appreciated that retaining system 10 may be configured, relative to the height of battery assembly 14, so that retaining portion 36 rests in contact with top side 62 when the retaining member is in the nominal position. Alternatively, the retaining portion may extend above top side 62 without contacting the battery assembly. This latter configuration is shown in FIG. 4 by the battery assembly which has a top side indicated in dash lines.

Regardless of whether the retaining portion contacts the top of battery assembly 14, it will be appreciated that the urging force imparted to the retaining member by spring 40 is along a direction parallel with top side 62. Thus, in contrast to prior art systems, retaining member 34 is configured not to transfer the urging force of the spring onto the battery assembly. This relieves the battery assembly of a source of long-term pressure that may damage the battery assembly. Alternatively, the battery retaining system may be configured to transfer some or all of the urging force to the battery.

It will be appreciated that battery retaining system 10 may be arranged in a variety of different ways depending on the particular configuration of vehicle 12, battery compartment 30, and battery assembly 14. For example, FIG. 5 illustrates an alternative arrangement in which retaining member 34 is oriented so that the end regions of the U-shaped member extend spaced apart from the battery assembly, while the central region extends downward toward the top of the battery assembly. In contrast to the embodiment depicted in FIGS. 2–4, therefore, the central region of the retaining member forms retaining portion 36, while the end regions form handle portion 38. Nevertheless, retaining member 34 is selectively slidable away from opening 32 to allow passage of battery assembly 14 into, or out of, battery compartment 30. A biasing member such as described above urges the retaining member from a retracted position away from opening 32 to a nominal position obstructing the opening.

As also shown in FIG. 5, exemplary battery assembly 14 includes a socket 39 adapted to engage a plug and cable assembly 41. Assembly 41 is coupled to motor assembly 24 (not shown) to carry electrical power from the battery assembly to the motor assembly. Alternatively, vehicle 12 may include other mechanisms for conducting electrical power from the battery assembly to the motor assembly. The arrangement illustrated in FIG. 5 also includes a battery compartment 30 that is substantially larger than battery assembly 14. Thus, the side walls of the battery compartment may not sufficiently support the battery assembly against lateral movement within the compartment. Instead, the exemplary battery compartment of FIG. 5 includes one or more mounts 43 positioned to extend adjacent one or more sides of the battery assembly and prevent lateral movement of the battery assembly within the battery compartment.

Turning attention now to FIGS. 6–9, an alternative embodiment of battery retaining system 10 is shown. Retaining member 34 is in the form of a generally rectangular bar slidably received in housing 42. Alternatively, retaining member 34 may be formed to have any other suitable shape as desired. In the depicted embodiment, retaining member 34 is formed as a molded plastic structure, but may alternatively be formed in other ways and/or from other materials. In any event, the retaining member includes a retaining portion 36 which extends generally parallel to the top side of battery assembly 14.

Figure 6:
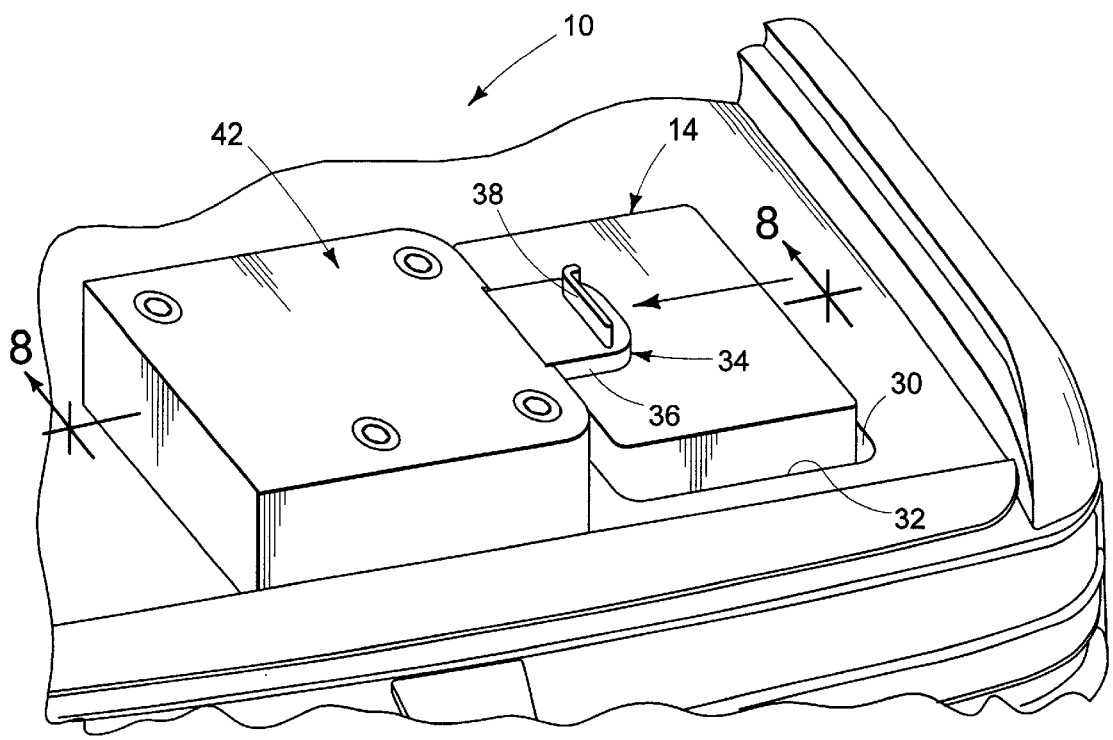
FIG. 6 is an isometric view of another embodiment of the battery retaining system according to the present invention.

In its nominal position shown in FIG. 6, retaining portion 36 extends toward battery compartment 30 to at least partially obstruct opening 32 and block installation or removal of the battery assembly. The retaining member is depicted as overlying a generally central portion of the battery assembly to better obstruct the opening. However, it will be appreciated that the retaining member may alternatively be configured to overlie other portions of the battery assembly. The relatively wide and flat shape of the retaining portion also provides stable support to the battery assembly in the event the vehicle is overturned. Handle portion 38 is configured to be gripped by a user to move the retaining member to a retracted position within the housing. The handle portion may be formed in a variety of alternative shapes suitable for gripping. One example of an alternative shape is indicated by dash lines in FIG. 7.

Retaining member 34 is received through an aperture in housing 42 and extends generally parallel to an upper inner surface 64 of the housing. The rear portion of the retaining member includes a pair of elongate guide slots 66 adapted to receive guide members 68. The guide members extend downward from upper inner surface 64 and into guide slots 66. Members 68 are slidable within slots 66 to substantially constrain the movement of retaining member 34 to a single direction. Each guide slot includes opposing end walls 70 which limit the length of travel of the retaining member, thereby preventing the retaining member from sliding out of housing 42.

Figure 7:
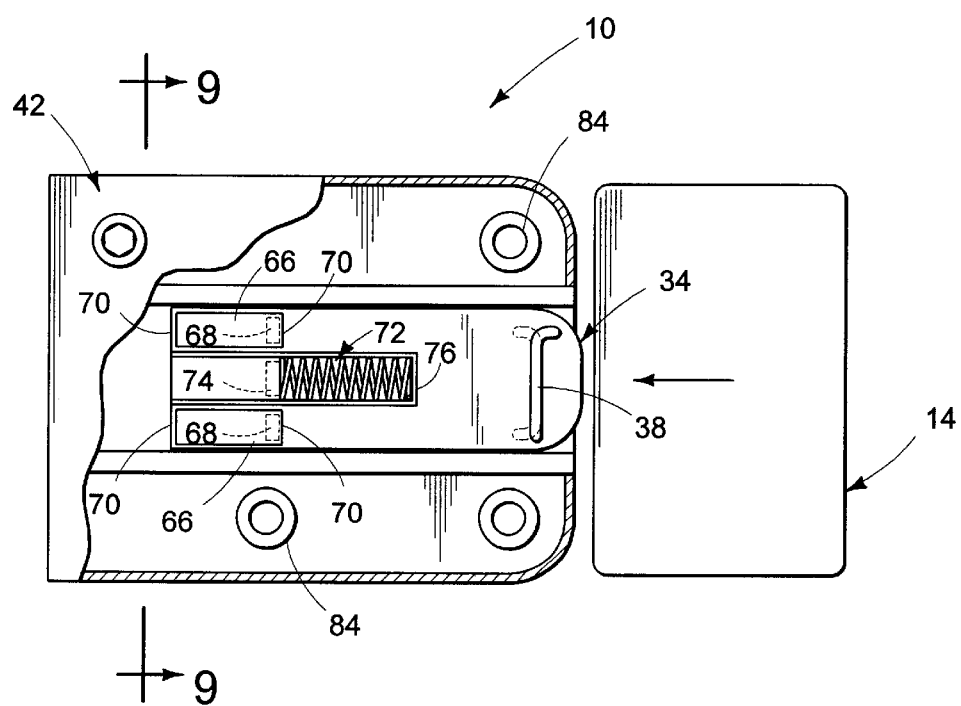
FIG. 7 is a fragmentary top plan view of the battery retaining system of FIG. 6.
Figure 8:
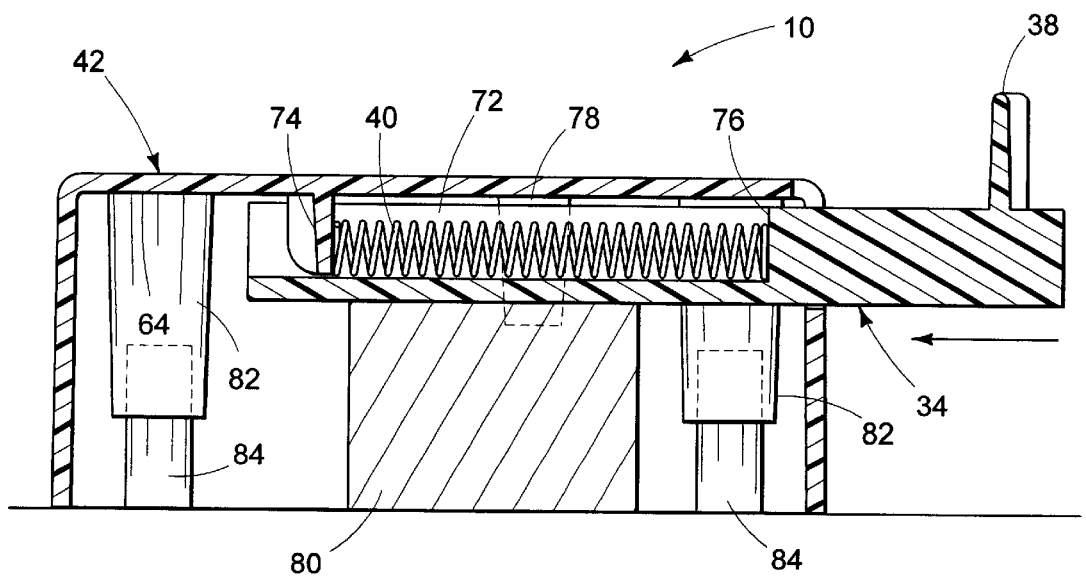
FIG. 8 is a cross-sectional view taken generally along the line 8—8 in FIG. 6.
Figure 9:
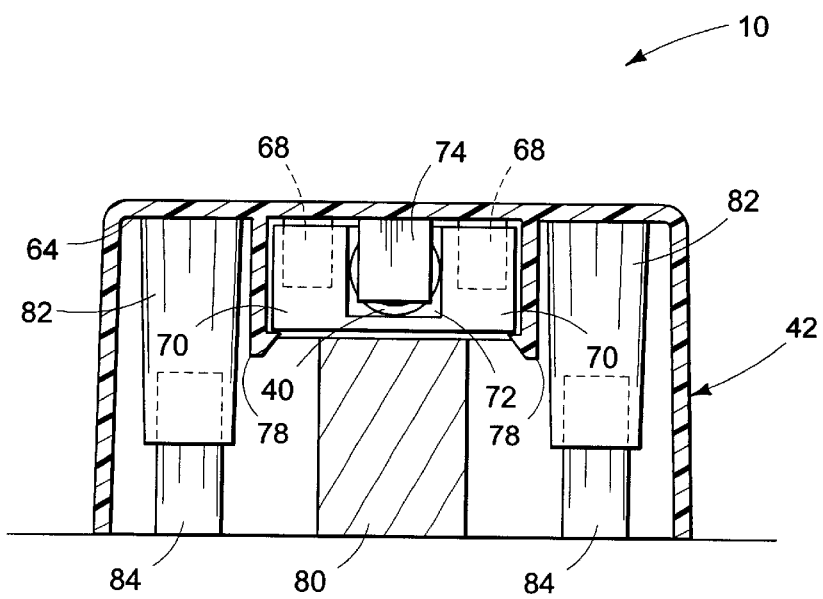
FIG. 9 is a cross-sectional view taken generally along the line 9—9 in FIG. 7.

Alternative retaining member 34 is also formed to define a spring chamber 72 between guide slots 66. Spring chamber 72 is adapted to receive a spring 40 or other suitable biasing member. The spring is enclosed within chamber 72 by upper inner surface 64. A bulkhead 74 extends downward from the upper inner surface into spring chamber 72. Spring 40 is positioned between bulkhead 74 and the front wall 76 of the spring chamber. When the retaining member is moved toward its retracted position as shown in FIG. 7, front wall 76 moves toward bulkhead 74, thereby compressing spring 40. As a result, the spring urges the retaining member back toward its nominal position.

Retaining member 34 is held adjacent upper inner surface 64 by one or more clips 78 which extend downward from the upper inner surface along the sides of the retaining member. Each clip includes an inwardly projecting lip that slidably supports the underside of the retaining member. The retaining member is also held adjacent the upper inner surface of housing 42 by a base member 80. The housing is mounted to body 16 above base member 80, which extends upward from the body to a position beneath retaining member 34 and prevents the retaining member from moving away from upper inner surface 64. Alternatively, the retaining member may be held adjacent the upper inner surface of the housing by other mechanisms.

In the alternative embodiment depicted in FIGS. 6–9, housing 42 includes a plurality of mounting sleeves 82. The mounting sleeves are adapted to fit over posts 84. Each sleeve 82 is adapted to receive a screw or similar fastener (not shown), which extends into and engages threaded bores (not shown) in posts 84. Thus, retaining member 34 and biasing member 40 cannot be removed from the body without disassembling or breaking the retaining system. Alternatively, the housing may be mounted on body 16 in other ways known to those of skill in the art.

As described above, battery retaining system 10 provides a reliable system for preventing a vehicle battery assembly from becoming dislodged during operation of the vehicle. Furthermore, system 10 is configured to allow the battery assembly to be installed or removed easily and without the use of tools. While various alternative embodiments and arrangements of battery retaining system 10 have been shown and described above, it will be appreciated by those of skill in the art that numerous other embodiments, arrangements, and modifications are possible and, therefore, within the scope of the invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A children's ride-on vehicle, comprising:
    a vehicle body adapted to carry a child;
    a plurality of wheels coupled to the body;
    a drive assembly coupled to drive at least one of the wheels, the drive assembly including a motor assembly having one or more battery-powered motors;
    a battery assembly disposed on the body and operably connected to the motor assembly; and
    a battery retainer assembly mounted on the body, including
        a retaining member selectively movable between a first position in which the retaining member blocks removal of the battery assembly from the body, and a second position in which the retaining member does not block removal of the battery assembly from the body, and
        a biasing member coupled to the retaining member and configured to urge the retaining member from the second position toward the first position.

2. The vehicle of claim 1, where the body includes a battery compartment adapted to hold the battery assembly, and where the battery compartment has an opening, and where the retaining member at least partially obstructs the opening when in the first position.

3. The vehicle of claim 2, where the opening is adapted to allow the battery assembly to be lowered into and raised out of the battery compartment, and where the retaining member at least partially overlies a top portion of the battery assembly when the battery assembly is in the battery compartment and the retaining member is in the first position.

4. The vehicle of claim 3, where the biasing member is configured to impart an urging force on the retaining member to urge the retaining member toward the first position, and where the retaining member is configured not to transfer the urging force to the battery assembly.

5. The vehicle of claim 4, where the retaining member is configured not to contact the battery assembly when the battery assembly is in the battery compartment and the retaining member is in the first position.

6. The vehicle of claim 1, where the retaining member is slidably coupled to the body for movement substantially constrained to a single direction relative to the body.

7. The vehicle of claim 1, where the retaining member is unremovably coupled to the body.

8. The vehicle of claim 7, where the biasing member is unremovably coupled to the body.

9. The vehicle of claim 1, where the biasing member includes a spring.

10. The vehicle of claim 1, where the retaining member includes a retaining portion adapted to extend adjacent at least a portion of the battery assembly when the retaining member is in the first position, and a handle portion spaced-apart from the battery assembly and adapted to be gripped by a rider to move the retaining member from the first position to the second position against the urging of the biasing member.

11. A children's ride-on vehicle having one or more battery-powered components, the vehicle comprising:
    a vehicle body;
    a battery assembly having at least one battery;
    a battery compartment disposed on the vehicle body and adapted to hold the battery assembly, where the battery compartment includes at least one opening adapted for passage of the battery assembly into or out of the battery compartment; and
    a battery retainer assembly disposed adjacent the battery compartment, the battery retainer assembly including a retaining member connected to a biasing member;
    where the retaining member is selectively movable from a nominal position which obstructs the opening to prevent passage of the battery assembly, to a retracted position which allows passage of the battery assembly through the opening; and
    where the biasing member is configured to urge the retaining member toward the nominal position when the retaining member is in the retracted position.

12. The vehicle of claim 11, where the retaining member is unremovably connected to the body.

13. The vehicle of claim 11, where the retaining member is coupled to the body and constrained to slide along a single direction between the nominal position and the retracted position.

14. The vehicle of claim 13, where the retaining member is constrained to slide along a single direction generally parallel with a top side of the battery assembly when the battery assembly is in the battery compartment.

15. The vehicle of claim 11, where the opening forms an upper portion of the battery compartment, and where the retaining member at least partially overlies a top portion of the battery assembly when the battery assembly is in the battery compartment and the retaining member is in the nominal position.

16. The vehicle of claim 15, where the retaining member is configured not to impart downward pressure on the battery assembly when the battery assembly is held within the battery compartment and the retaining member is in the nominal position.

17. The vehicle of claim 11, where the retaining member includes a retaining portion adapted to extend adjacent at least a portion of the battery assembly when the retaining member is in the nominal position, and a handle portion spaced-apart from the battery assembly and adapted to be gripped by a rider to move the retaining member from the nominal position to the retracted position against the urging of the biasing member.

18. The vehicle of claim 11, where the battery retainer assembly includes a housing mounted on the body and adapted to slidably receive at least a portion of the retaining member, and where the biasing member includes a spring disposed within the housing.

19. A children's ride-in vehicle, comprising:
    a battery assembly having one or more batteries;
    a vehicle body adapted to carry a child, the body including a battery compartment adapted to hold the battery assembly and having at least one opening through which the battery assembly may be passed;
    one or more wheels coupled to the body;
    a drive assembly coupled to drive at least one of the wheels, the drive assembly including a motor assembly having one or more battery-powered motors operably connected to the battery assembly;
    a retaining member coupled to the body and positioned to extend over at least a portion of the opening to obstruct passage of the battery assembly; and
    a biasing member coupled to the retaining member;
    where the retaining member is selectively slidable away from the opening against the urging of the biasing member.

20. The vehicle of claim 19, further comprising a housing mounted on the body, and where at least a portion of the retaining member is received in the housing and slidable within the housing generally along a single direction.

21. The vehicle of claim 20, where the biasing member is disposed in the housing and configured to urge the retaining member toward the opening.

22. The vehicle of claim 21, where the housing includes a cover adapted to enclose the biasing member.

23. The vehicle of claim 20, where the retaining member includes a handle portion extending away from the opening and adapted to be gripped by a rider to slide the retaining member away from the opening.

* * * * *